(12) United States Patent
Saitou et al.

(10) Patent No.: US 7,268,997 B2
(45) Date of Patent: Sep. 11, 2007

(54) SOLID ELECTROLYTIC CAPACITOR

(76) Inventors: Takeshi Saitou, c/o NEC TOKIN Corporation, 7-1, Koriyama 6-chome, Taihaku-ku, Sendai-shi, Miyagi (JP); Takeo Kasuga, c/o NEC TOKIN Corporation, 7-1, Koriyama 6-chome, Taihaku-ku, Sendai-shi, Miyagi (JP); Katsuhiro Yoshida, c/o NEC TOKIN Corporation, 7-1, Koriyama 6-chome, Taihaku-ku, Sendai-shi, Miyagi (JP); Sadamu Toida, c/o NEC TOKIN Corporation, 7-1, Koriyama 6-chome, Taihaku-ku, Sendai-shi, Miyagi (JP)

( * ) Notice: Subject to any disclaimer, the term of this patent is extended or adjusted under 35 U.S.C. 154(b) by 0 days.

(21) Appl. No.: 11/507,705

(22) Filed: Aug. 22, 2006

(65) Prior Publication Data

US 2007/0047178 A1    Mar. 1, 2007

(30) Foreign Application Priority Data

Aug. 29, 2005   (JP)   ............................. 2005-247481

(51) Int. Cl.
*H01G 9/02*   (2006.01)
*H01F 9/00*   (2006.01)

(52) U.S. Cl. ..................................... 361/525; 29/25.03

(58) Field of Classification Search ................ 361/523, 361/524, 525, 528; 29/25.03
See application file for complete search history.

(56) References Cited

U.S. PATENT DOCUMENTS

2006/0062958 A1*   3/2006   Yoshida et al. ............ 428/64.4
2006/0076541 A1*   4/2006   Yoshida et al. ............ 252/500

FOREIGN PATENT DOCUMENTS

| JP | 11087180 A | * | 3/1999 |
| JP | 2001102255 A | * | 4/2001 |
| JP | 2005-159154 | | 6/2005 |

\* cited by examiner

*Primary Examiner*—Eric W. Thomas
(74) *Attorney, Agent, or Firm*—Bradley N. Ruben

(57) ABSTRACT

An aluminum solid electrolytic capacitor (conductive polymer type solid electrolytic capacitor) has an anodic oxide film layer, a conductive polymer layer, and a polystyrene sulfonate layer interposed between the anodic oxide film layer and the conductive polymer layer. A transmission line element has a cathode portion formed on a central portion of an aluminum substrate in an aluminum solid electrolytic capacitor. The transmission line element also has a pair of anode terminal areas located at both sides of the cathode portion on the aluminum substrate and is configured to supply a current between the pair of anode terminal areas.

16 Claims, 3 Drawing Sheets

SOLID ELECTROLYTIC CAPACITOR

This application claims priority to prior Japanese patent application JP 2005-247481, the disclosure of which is incorporated herein by reference.

BACKGROUND OF THE INVENTION

The present invention relates to a solid electrolytic capacitor, and more particularly to a solid electrolytic capacitor having an improved precoat between an oxide film and a solid electrolyte in the solid electrolytic capacitor.

In recent years, there was developed a solid electrolytic capacitor produced by forming a dielectric oxide film, which is hereinafter referred to as an anodic oxide film, on a porous member of a valve action metal such as aluminum by an anodic oxidation method, and then forming a conductive polymer layer as a solid electrolyte on the anodic oxide film. The solid electrolyte in this solid electrolytic capacitor has a conductivity 10 to 100 times higher than a solid electrolyte of manganese dioxide. Further, the solid electrolytic capacitor can have a low equivalent series resistance (ESR), and high-frequency characteristics are remarkably improved. Accordingly, this type of solid electrolytic capacitor is getting to be employed in various electronic devices for the purpose of removing high-frequency noise in small-sized devices.

Larger packing densities and higher speeds of electronic components increasingly require a smaller size, a larger capacity, and a lower ESR of a capacitor. Several attempts have been made to increase a capacitance per unit area. These include increasing an etching magnification of an aluminum substrate as a valve action metal, or increasing a volumetric efficiency, which is a ratio of a volume of a product and a volume of a capacitor by laminating capacitor elements.

The inventors have proposed a method for increasing capacitance by improving a substantial coverage of the conductive polymer layer to an anodic oxide film. This result seems to come from an improved adhesiveness between the anodic oxide film and a polypyrrole conductive polymer layer. This method is disclosed in Japanese Unexamined Patent Application Publication (JP-A) No. 2005-159154, which is hereinafter referred to as Patent Document 1. According to this method, a surface of an aluminum substrate, which serves as an anode portion, is roughened by etching. An aluminum dielectric film or an anodic oxide film layer is formed on the roughened surface of the aluminum substrate in an aqueous solution containing ammonium adipate, phosphoric acid, ammonium phosphate, or the like. Then, the aluminum substrate is immersed in a polystyrene sulfonic acid solution and dried to form a thin film of polystyrene sulfonic acid as a precoat layer on a surface of the anodic oxide film. Thereafter, the aluminum substrate having the precoat layer formed is immersed in a solution containing a monomer for producing a conductive polymer, and then, is immersed in a solution containing protonic acid, metal halide, peroxide, or the like to form a conductive polymer film or an internal polymerization film layer, such as a polypyrrole film, a polythiophene film, or a polyoxy thiophene film. In case of, say, the polypyrrole layer, the precoat layer of polystyrene sulfonic acid is reacted with the polypyrrole layer to provide an improved adhesiveness between the anodic oxide film layer and the polypyrrole layer, leading an improved coverage of the conductive polymer layer to the anodic oxide film. Then, a plurality of conductive polymer films or external polymerization film layers, such as polypyrrole films, polythiophene films, or polyoxy thiophene films, are formed on the internal polymerization film layer by a chemical oxidation polymerization method. Then, a graphite layer and a silver paste layer are formed on the external polymerization film layers to provide a cathode portion.

The precoat layer of polystyrene sulfonic acid in the solid electrolytic capacitor disclosed in Patent Document 1 is very effective in improvement of a coverage. However, a polystyrene sulfonic acid is a water-soluble polymer compound. Although a portion of the precoat layer that has reacted with polypyrrole of the conductive polymer film formed on the precoat layer is not dissolved into water, a portion of the precoat layer that has not reacted with polypyrrole may be dissolved into water. A trace of polystyrene sulfonic acid dissolved into water has a pH of about 0.5 to about 1 and is thus strongly acid. The dissolved polystyrene sulfonic acid may have an adverse influence on the anodic oxide film and may cause an increase of a leaking current (LC) when the solid electrolytic capacitor is used at a high humidity.

SUMMARY OF THE INVENTION

The present invention has been made in view of the above drawbacks.

It is, therefore, an object of the present invention to provide a solid electrolytic capacitor having an excellent humidity resistance, a large capacitance, and a low ESR with a compact structure.

It is another object of the present invention to provide a method of manufacturing a solid electrolytic capacitor having an excellent humidity resistance.

It is still another object of the present invention to provide a solid electrolytic capacitor having a transmission line structure with an improved humidity resistance.

It is yet another object of the present invention to provide a method of manufacturing a solid electrolytic capacitor having a transmission line structure with an improved humidity resistance.

According to one aspect of the present invention, there is provided a solid electrolytic capacitor which includes: an aluminum substrate having a roughened surface; an anodic oxide film layer formed on said roughened surface of the aluminum substrate; a polystyrene sulfonate layer formed on a portion of the anodic oxide film layer; and a conductive polymer film layer formed as a solid electrolyte on the polystyrene sulfonate layer so that the polystyrene sulfonate layer is interposed between the anodic oxide film layer and the conductive polymer film layer.

Preferably, the polystyrene sulfonate layer is formed by immersing the aluminum substrate in an aqueous solution and drying the aluminum substrate. The aqueous solution is prepared by adding at least one of an amine, an amine salt produced by reaction of an amine and an organic acid, an ammonium salt of an organic acid or an inorganic acid, and ammonia water to a polystyrene sulfonic acid solution having a concentration of 0.1 to 10 weight % to adjust a pH of the aqueous solution in a range of from 2 to 6.

Preferably, the amine includes at least one of triethylamine and triethanolamine. The amine salt includes at least one of amine salts produced by reaction of the amine and at least one of boric acid, malonic acid, maleic acid, adipic acid, sebacic acid, dodecanoic acid, citric acid, phthalic acid, terephthalic acid, and pyromellitic acid. The ammonium salt includes at least one of an ammonium borate, an ammonium adipate, an ammonium sebacate, and an ammonium dodecanoate.

Preferably, a voltage treatment is performed with an aqueous solution containing an ammonium salt of an organic acid of adipic acid or citric acid after said polystyrene sulfonate layer is formed.

According to another aspect of the present invention, there is provided a method of manufacturing a solid electrolytic capacitor, the method includes the steps of: roughening a surface of an aluminum substrate; forming an anodic oxide film layer on the surface of the aluminum substrate; forming a polystyrene sulfonate layer on a portion of the anodic oxide film layer; and forming a conductive polymer film layer as a solid electrolyte on the polystyrene sulfonate layer.

Preferably, the step of forming the polystyrene sulfonate layer includes:

adding at least one of an amine, an amine salt produced by reaction of an amine and an organic acid, an ammonium salt of an organic acid or an inorganic acid, and ammonia water to a polystyrene sulfonic acid solution having a concentration of 0.1 to 10 weight % to prepare an aqueous solution having a pH of 2 to 6; immersing said aluminum substrate in the aqueous solution; and drying said aluminum substrate.

Preferably, the amine includes at least one of triethylamine and triethanolamine. The amine salt includes at least one of amine salts produced by reaction of said amine and at least one of boric acid, malonic acid, maleic acid, adipic acid, sebacic acid, dodecanoic acid, citric acid, phthalic acid, terephthalic acid, and pyromellitic acid. The ammonium salt includes at least one of an ammonium borate, an ammonium adipate, an ammonium sebacate, and an ammonium dodecanoate.

Preferably, the method further includes the step of: performing a voltage treatment with an aqueous solution containing an ammonium salt of an organic acid of adipic acid or citric acid after the step of forming the polystyrene sulfonate layer.

The above and other objects, features, and advantages of the present invention will be apparent from the following description when taken in conjunction with the accompanying drawings which illustrate preferred embodiments of the present invention by way of example.

DETAILED DESCRIPTION OF THE PREFERRED EMBODIMENTS

Figure 1A:
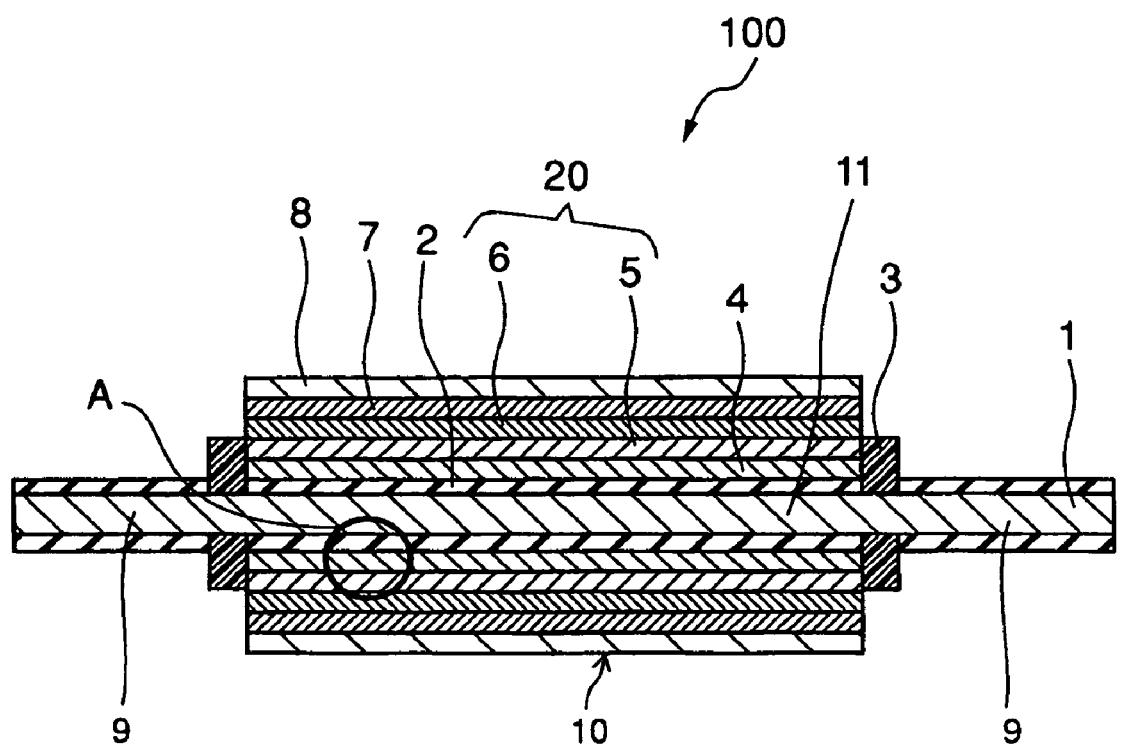
FIG. 1A is a cross-sectional view showing a solid electrolytic capacitor according to an embodiment of the present invention.

A solid electrolytic capacitor according to an embodiment of the present invention will be described below with reference to FIGS. 1A through 6. Like or corresponding parts are denoted by like or corresponding reference numerals throughout drawings, and will not be described below repetitively. A solid electrolytic capacitor according to the present invention is an improvement of a solid electrolytic capacitor as disclosed by Patent Document 1.

Figure 1B:
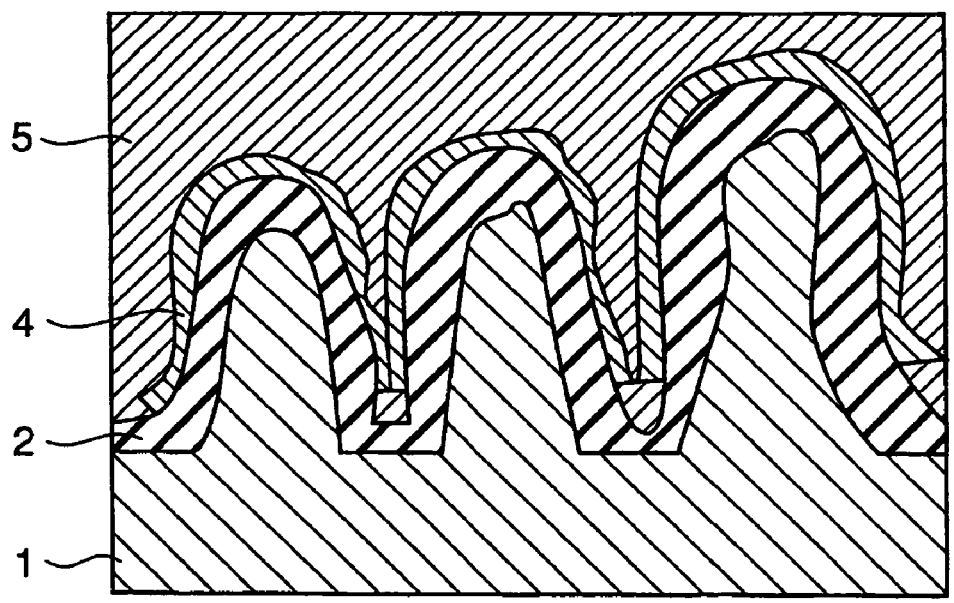
FIG. 1B is an enlarged view of an encircled portion A of FIG. 1A.

FIG. 1A is a cross-sectional view showing a solid electrolytic capacitor 100 according to an embodiment of the present invention, and FIG. 1B is an enlarged view of an encircled portion A of FIG. 1A. As shown in FIGS. 1A and 1B, the solid electrolytic capacitor 100 has an aluminum substrate 1 of aluminum foil. The aluminum substrate 1 has a surface roughened by etching or the like. The solid electrolytic capacitor 100 has an anodic oxide film layer 2 formed on the roughened surface of the aluminum substrate 1. The solid electrolytic capacitor 100 also has a conductive polymer film layer 20 formed as a solid electrolyte layer over the anodic oxide film layer 2. The conductive polymer film layer 20 includes an internal polymerization film layer 5 and an external polymerization film layer 6. The solid electrolytic capacitor 100 includes a polystyrene sulfonate layer 4 formed as a precoat layer between the anodic oxide film layer 2 and the conductive polymer film layer 20.

More specifically, a surface of the aluminum substrate 1 of aluminum foil is roughened by etching. Anodic oxidation is performed on the roughened surface of the aluminum substrate 1 in an aqueous solution containing adipic acid, citric acid, phosphoric acid, salts of these acids, or the like to form the aluminum anodic oxide film layer 2 on the roughened surface of the aluminum substrate 1. Then, resist members 3 of thermosetting resin are provided to divide the aluminum substrate 1 into a capacitance formation area and anode terminal areas 9 to be connected to anode leads or anode terminals. These anode terminal areas 9 are referred to as an anode terminal connecting portion. The capacitance formation area of the aluminum substrate 1 serves as an anode portion 11. Although the resist members 3 are made of thermosetting resin, such as epoxy resin, in this example, the resist members 3 may be made of thermoplastic resin to achieve the same effects.

Then, the precoat layer 4 of polystyrene sulfonate is formed on the anodic oxide film layer 2 until the precoat layer 4 reaches an interior of a porous member of the anodic oxide film layer 2. Thereafter, the internal chemical polymerization layer or an internal polymerization film layer 5 is formed on the precoat layer 4 by chemical oxidation polymerization of a conductive polymer such as polypyrrole. Further, a slurry polymer of 3,4-ethylene dioxy thiophene is applied onto a surface of the internal polymerization film layer 5 and dried to form an external chemical polymerization layer or an external polymerization film layer 6 as a slurry polymer layer on the internal polymerization film layer 5. Furthermore, a conductive graphite layer 7 and a conductive silver paste layer 8 are sequentially formed on the slurry polymer layer 6. Thus, a solid electrolytic capacitor 100 having a transmission line structure is produced. The graphite layer 7 and the silver paste layer 8 form a cathode portion 10 together with the precoat layer 4 and the conductive polymer film layer 20. The silver paste layer 8 serves as a cathode terminal connection portion to be connected to a cathode lead or a cathode terminal. The capacitance formation area is positioned at a region in which the cathode portion 10 and the anode portion 11 are opposed to each other while the anodic oxide film layer 2 is interposed between the cathode portion 10 and the anode portion 11.

Anode leads or terminals connected to the anode terminal areas or anode terminal connection portion 9 and cathode leads or terminals connected to the silver paste layers 8 are not illustrated in the solid electrolytic capacitor 100 shown in FIG. 1A.

The precoat layer 4 of polystyrene sulfonate is formed as follows. First, an amine salt produced by reaction of an amine and an organic acid or an ammonium salt of either an organic acid or an inorganic acid is added to a polystyrene sulfonic acid solution having a concentration of 0.1 to 10 weight % to prepare a solution having a pH of 2 to 6. The aluminum substrate 1 on which the anodic oxide film layer 2 has been formed is immersed in the solution and then dried to form the precoat layer 4 on the anodic oxide film layer 2.

In the present invention, amines, amine salts, ammonia water, and/or ammonium salts of organic acids or inorganic acids can be used as a base to be added to the polystyrene sulfonic acid solution to form the precoat layer 4 of polystyrene sulfonate. The inventors examined various bases and found it desirable to use the following bases.

Preferable examples of the amines include organic compounds having an amino group, such as 4-methoxy-2,2',4'-trimethyl diphenylamine, 2-ethylhexylamine, hexadecylamine, octadecylamine, dimethylamine, diethylamine, di-isopropylamine, dibutylamine, trimethylamine, triethylamine, tributylamine, triallylamine, ethylenediamine, 1,2-diaminopropane, 1,3-diaminopropane, hexamethylenediamine, triethanolamine, and diethylene triamine. Among those amines, triethylamine or triethanolamine is more preferable.

In case of amine salts to be added to the polystyrenesulfonic acid, it is preferred to use amine salts which are produced by reaction of aforementioned amines with an organic fatty acid, such as adipic acid, dodecanoic acid, sebacic acid, citric acid, maleic acid, malonic acid, phthalic acid, terephthalic acid, and pyromellitic acid, or an inorganic acid, such as boric acid.

Preferable examples of the ammonium salts include an ammonium borate, which is an ammonium salt of an inorganic acid, an ammonium adipate, an ammonium sebacate, and an ammonium dodecanoate, which are ammonium salts of organic acids.

It is preferred to use, as organic acids to form the ammonium salts of the organic acids, the aforementioned organic fatty acids such as adipic acid, dodecanoic acid, sebacic acid, citric acid, maleic acid, malonic acid, phthalic acid, terephthalic acid, and pyromellitic acid. Further, it is desirable to use the aforementioned boric acid as an inorganic acid to form an ammonium salt of an inorganic acid.

Ammonia water of an inorganic compound may be used as a base to be added to the polystyrene sulfonic acid solution.

In the present embodiment, the conductive polymer layers are formed after the formation of the polystyrene sulfonate layer. However, it is desirable that a voltage treatment is performed with an aqueous solution containing an ammonium salt of an organic acid such as adipic acid or citric acid after the formation of the polystyrene sulfonate layer, and then conductive polymer layers are formed on the polystyrene sulfonate layer.

As described above, a solid electrolytic capacitor according to the present invention is an improvement of a solid electrolytic capacitor as disclosed by Patent Document 1. In order to evaluate characteristics of a precoat layer 4 in a solid electrolytic capacitor according to the present invention, the following experiments were conducted.

<Withstand Voltage of Precoat Layer>

As a sample formed with a precoat layer of Example (I) according to the present invention, aluminum foil was cut so as to have a predetermined size and was subjected to anodic oxidation at a voltage of 8 V to form an anodic oxide film on the aluminum foil. Then, the aluminum foil was immersed for 30 minutes in a solution in which polystyrene sulfonic acid of 1.5 weight % and triethanolamine of 1.1 weight % were mixed with each other and then dried to form a thin precoat layer of polystyrene sulfonate on the anodic oxide film.

As a sample formed with a precoat layer of Example (II) according to the present invention, an anodic oxide film was first formed on aluminum foil in the same manner as Example (I). Then, the aluminum foil was immersed for 30 minutes in a solution in which polystyrene sulfonic acid of 1.5 weight %, triethanolamine of 1.0 weight %, and adipic acid of 0.5 weight % were mixed with each other and then dried to form a thin precoat layer of polystyrene sulfonate on the anodic oxide film.

Further, as a sample of Comparative Example (i), an anodic oxide film was formed on aluminum foil in the same manner as Example (I) to prepare a sample having no thin precoat layers.

Furthermore, as a sample formed with a precoat layer of Comparative Example (ii), an anodic oxide film was first formed on aluminum foil in the same manner as Example (I). Then, with a conventional method, the aluminum foil was immersed in a polystyrene sulfonic acid solution of 1.5 weight % for 30 minutes and then dried to form a thin precoat layer of polystyrene sulfonic acid on the anodic oxide film.

Samples of Example (I) were placed and held for 24 hours, 48 hours, and 72 hours, respectively, in a high-humidity chamber, which was maintained at a constant temperature of 65° C. and a constant humidity of 95%. In the similar manner, samples of Example (II) and Comparative Examples (i) and (ii), were placed and held for 24 hours, 48 hours, and 72 hours, respectively, in a high-humidity chamber, which was maintained at a constant temperature of 65° C. and a constant humidity of 95%.

After taking out the samples from the high-humidity chamber at the lapse of the respective holding times, each of the samples was tested to see withstand voltage. A voltage behavior is observed by supplying each of the samples with a constant current at a current density (I) of 2 $A/m^2$ for 10 minutes in a solution (anodizing solution) containing ammonium adipate of 7.5 weight % and ammonium dihydrogenphosphate of 0.05 weight %. More specifically, the sample was immersed in the solution in a container, and a constant current was supplied for 10 minutes between the aluminum substrate of the sample, which serves as an anode, and the container which serves as a cathode. The voltage behavior was obtained by measuring a voltage between the anode and the cathode with time. A voltage after 5 minute from the start of the current supply was defined as a withstand voltage.

Other samples of Examples (I) and (II) and Comparative Examples (i) and (ii) were similarly prepared to measure an initial withstand voltage without exposing to the high-humidity chamber. Each of the other samples was supplied with a constant current at the same current density as described above for 10 minutes in the afore mentioned anodizing solution. Using the withstand voltages of these other samples as initial withstand voltages, withstand voltage variation ratios of each of the samples were plotted with respect to hours as shown in FIG. 2.

Figure 2:
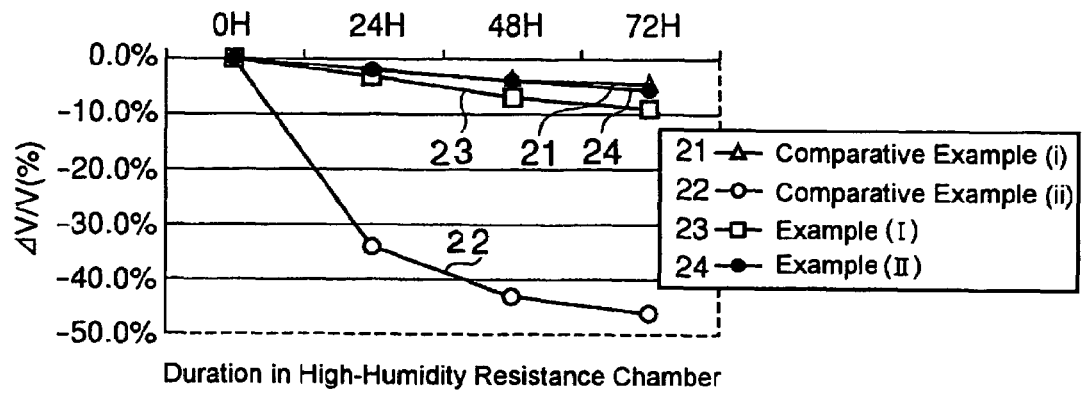
FIG. 2 is a graph showing relationships between voltage variation ratios and holding time in a high-humidity chamber about samples of Examples (I) and (II), which have a precoat layer according to the present invention, a sample of Comparative Example (i), which has no precoat layers, and a sample of Comparative Example (ii), which has a precoat layer.

As shown in FIG. 2, in a high-humidity resistance test, the sample having the precoat layer produced in Comparative Example (ii) by the conventional method had a voltage change ratio, as indicated by a line 22, higher than that of the sample having no precoat layers in Comparative Example (i), as indicated by a line 21. Thus, the sample of Comparative Example (ii) could not maintain a withstand voltage after it was formed. Accordingly, a rated voltage was required to be lower than the decreased withstand voltage.

However, with regard to the samples having the inventive precoat layer in Examples (I) and (II), the withstand voltage was hardly decreased as indicated by lines 23 and 24. Accordingly, it was possible to increase a rated voltage with the same formation voltage.

Examples (III) and (IV) will be described below. In Example (I), a solution in which polystyrene sulfonic acid of 1.5 weight % and triethanolamine of 1.1 weight % were mixed with each other was used. However, in Example (III), triethylamine 0.75 weight % was used in a solution instead of triethanolamine. As with Example (I), an aluminum substrate on which an anodic oxide film had been formed was immersed in the solution for 30 minutes and then dried to form a precoat layer on the anodic oxide film.

In Example (IV), ammonium adipate of 1.3 weight % was used in an aqueous solution instead of triethanolamine in Example (I). As with Example (I), an aluminum substrate on which an anodic oxide film had been formed was immersed in the aqueous solution for 30 minutes and then dried to form a precoat layer.

Figure 3:
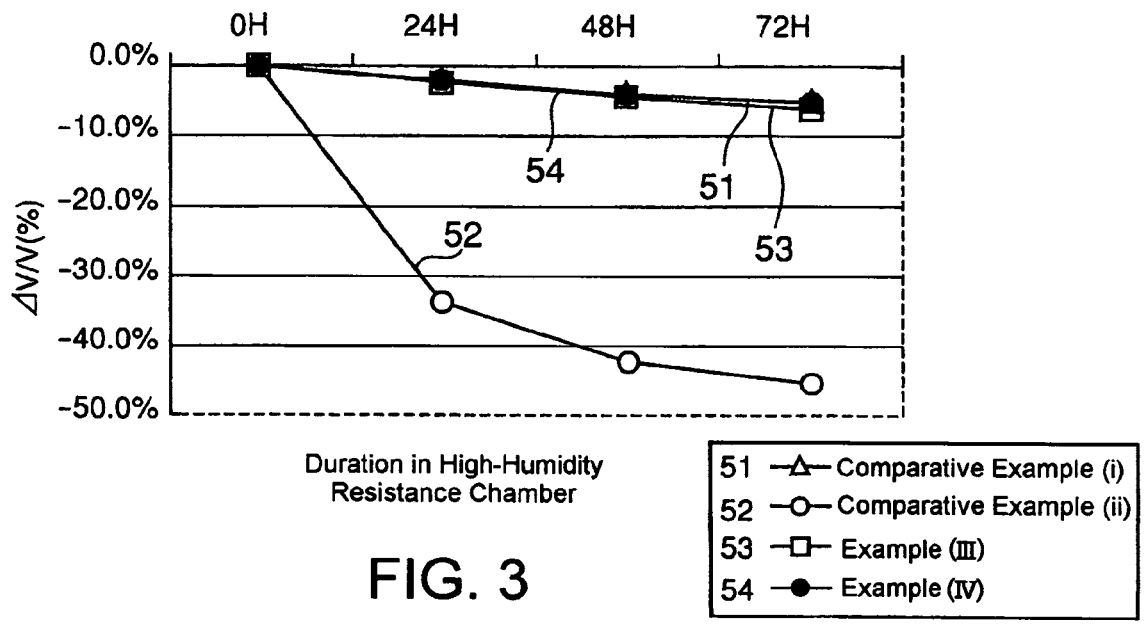
FIG. 3 is a graph showing relationships between voltage variation ratios holding time in a high-humidity chamber concerning samples of Examples (III) and (IV), which have a precoat layer according to the present invention, a sample of Comparative Example (i), which has no precoat layers, and a sample of Comparative Example (ii), which has a precoat layer.

The samples having a precoat layer, which were obtained in Examples (III) and (IV), were subjected to a high-humidity resistance test, as with the aforementioned samples. The results are shown in FIG. 3 with the measurement results of the samples of Comparative Examples (i) and (ii). The results of FIG. 3 show that the sample having a precoat layer of polystyrene sulfonate in Example (III), as indicated by a line 53, had substantially the same effects as the sample of Comparative Example (i), which was not subjected to a precoat treatment (had no precoat layers). Further, as indicated by a line 54, the sample having a precoat layer of polystyrene sulfonate in Example (IV) had the same effects as the sample of Comparative Example (i), which was not subjected to a precoat treatment.

Examples (V) and (VI) will be described below. In Example (II), an aqueous solution in which polystyrene sulfonic acid of 1.5 weight %, triethanolamine of 1.1 weight %, and adipic acid of 0.5 weight % were mixed with each other was used. However, in Example (V), dodecanoic acid of 0.69 weight % was used in an aqueous solution instead of adipic acid. As with Example (II), an aluminum substrate on which an anodic oxide film had been formed was immersed in the aqueous solution for 30 minutes and then dried to form a precoat layer on the anodic oxide film.

In Example (VI), sebacic acid of 0.69 weight % was used in an aqueous solution instead of adipic acid in Example (II). As with Example (II), an aluminum substrate on which an anodic oxide film had been formed was immersed in the aqueous solution for 30 minutes and then dried to form a precoat layer on the anodic oxide film.

Figure 4:
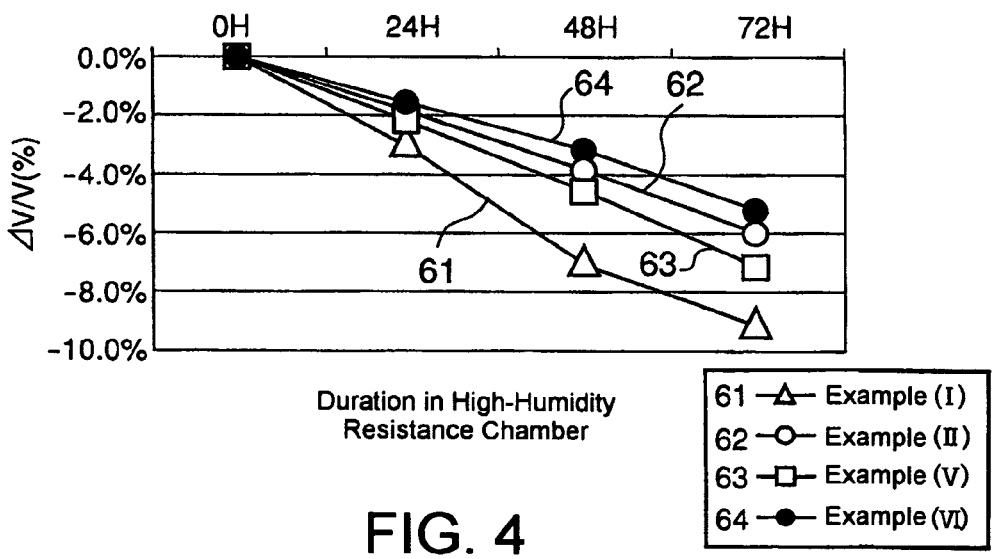
FIG. 4 is a graph showing relationships between voltage variation ratios and holding time in a high-humidity chamber as to samples of Examples (V) and (VI), which have a precoat layer according to the present invention, and samples of Examples (I) and (II), which have a precoat layer.

The samples obtained in Examples (V) and (VI) were subjected to a high-humidity resistance test, as with Examples (III) and (IV). The results are shown in FIG. 4, which also includes the results of the high-humidity resistance test of the samples of Examples (I) and (II). From the results of FIG. 4, it can be expected that the samples having a precoat layer of polystyrene sulfonate in Examples (V) and (VI), as indicated by curves 63 and 64, have the same effects as the samples having a precoat layer of polystyrene sulfonate in Examples (I) and (II) as indicated by curves 61 and 62.

<Measurement of Coverage>

Next, effects of a polystyrene sulfonic acid concentration on a coverage of polystyrene sulfonate was examined.

First, aluminum foil was cut so as to have a predetermined size and was subjected to anodic oxidation at a voltage of 8 V to form an anodic oxide film on the aluminum foil. Then, the aluminum foil was immersed in a mixture of ethanolamine and a polystyrene sulfonic acid solution having various polystyrene sulfonic acid concentrations in a range of from 0 to 20 weight %. The aluminum foil was dried to form a precoat layer on the anodic oxide film. Thereafter, as described in Patent Document 1, a conductive polymer film such as a polypyrrole film or a polythiophene film was formed on the precoat layer by chemical oxidation polymerization. Further, a graphite layer and a silver paste layer were sequentially formed on the conductive polymer to form a solid electrolytic capacitor element. The capacitance C of the element was measured at 120 Hz, and a change ratio $\Delta C/C0$ (%) was calculated with respect to a capacitance C0 (%) at a polystyrene sulfonic acid concentration of 0 weight %. This relationship is shown in FIG. 5.

Figure 5:
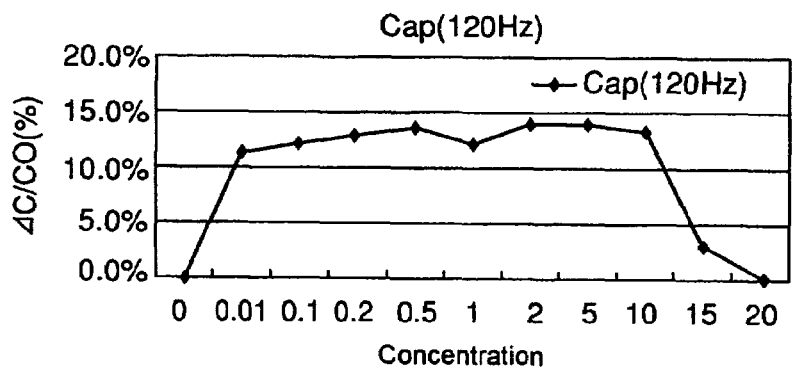
FIG. 5 is a graph showing effects of a concentration of polystyrene sulfonic acid, which is used to form a precoat layer of polystyrene sulfonate in a solid electrolytic capacitor, on a capacitance.

The results of FIG. 5 show that the capacitance was increased when a thin polystyrene sulfonate layer was formed with polystyrene sulfonic acid concentrations of 0.01 to 10 weight %. Accordingly, it can be seen that polystyrene sulfonate could provide a solid electrolytic capacitor having an excellent coverage.

<Variation Characteristics of Leakage Current in High-humidity Resistance Test and Effects of Voltage Treatment>

Next, variation characteristics of leakage current was examined for solid electrolytic capacitors of Examples (VII) to (X) when the solid electrolytic capacitors were left in a high-humidity chamber.

First, in Example (VII), a precoat layer was formed in the same manner as Example (I). Specifically, aluminum foil was cut so as to have a predetermined size and was subjected to anodic oxidation at a voltage of 8 V to form an anodic oxide film on the aluminum foil. Then, the aluminum foil was immersed for 30 minutes in an aqueous solution in which polystyrene sulfonic acid of 1.5 weight % and triethanolamine of 1.1 weight % were mixed with each other and then dried to form a precoat layer on the anodic oxide film. Thereafter, a constant current was supplied at a current density (I) of 2 $A/m^2$ for 10 minutes in an aqueous solution containing ammonium adipate of 7.5 weight % and ammonium dihydrogenphosphate of 0.05 weight %, and a voltage treatment was performed in the following manner. Using the aluminum foil having the precoat layer as an anode and a container (tank) holding an anodizing solution as a cathode, an applied voltage was increased to 7.8 V at a speed of 12 V/min and then maintained at 7.8 V for 10 minutes. Thereafter, as described in Patent Document 1, a conductive polymer film such as a polypyrrole film or a polythiophene film was formed on the precoat layer by chemical oxidation polymerization. Further, a graphite layer and a silver paste layer were sequentially formed on the conductive polymer to produce a solid electrolytic capacitor.

In Example (VIII), a precoat layer was formed in the same manner as Example (VII). Then, without a voltage treatment, a conductive polymer layer such a polypyrrole film or a polythiophene film was formed on the precoat layer by chemical oxidation polymerization to produce a solid electrolytic capacitor.

In Example (IX), an anodic oxide film was formed on aluminum foil in the same manner as Example (II). The aluminum foil was immersed for 30 minutes in an aqueous solution in which polystyrene sulfonic acid of 1.5 weight %, triethanolamine of 1.0 weight %, and adipic acid of 0.5 weight % were mixed with each other and then dried to form a precoat layer as with Example (II). Then, a constant current was supplied at a current density (I) of 2 A/m$^2$ for 10 minutes in an aqueous solution containing ammonium adipate of 7.5 weight % and ammonium dihydrogenphosphate of 0.05 weight %, and a voltage treatment was performed. Thereafter, as described in Patent Document 1, a conductive polymer film such as a polypyrrole film or a polythiophene film was formed on the precoat layer by chemical oxidation polymerization. Further, a graphite layer and a silver paste layer were sequentially formed on the conductive polymer to produce a solid electrolytic capacitor.

In Example (X), a precoat layer was formed in the same manner as Example (IX). Then, without a voltage treatment, a conductive polymer layer such a polypyrrole film or a polythiophene film was formed on the precoat layer by chemical oxidation polymerization to produce a solid electrolytic capacitor.

In Comparative Example (iii), an anodic oxide film was formed on an aluminum substrate in the same manner as Comparative Example (ii). With a conventional method, the aluminum substrate was immersed for 30 minutes in an aqueous solution containing polystyrene sulfonic acid of 1.5 weight % and then dried to form a precoat layer on the anodic oxide film. Then, a constant current was supplied at a current density (I) of 2 A/m$^2$ for 10 minutes in an aqueous solution containing ammonium adipate of 7.5 weight % and ammonium dihydrogenphosphate of 0.05 weight %, and a voltage treatment was performed. Thereafter, as described in Patent Document 1, a conductive polymer film such as a polypyrrole film or a polythiophene film was formed on the precoat layer by chemical oxidation polymerization. Further, a graphite layer and a silver paste layer were sequentially formed on the conductive polymer to produce a solid electrolytic capacitor.

In Comparative Example (iv), a precoat layer was formed in the same manner as Comparative Example (iii). Then, without a voltage treatment, a conductive polymer layer such a polypyrrole film or a polythiophene film was formed on the precoat layer by chemical oxidation polymerization to produce a solid electrolytic capacitor.

Each of samples of Examples (VII) to (X) and Comparative Examples (iii) and (iv) was placed in the aforementioned high-humidity chamber for 72 hours and then taken out of the high-humidity chamber. Voltages of 2.5 V, 4.0 V, and 6.3 V were applied for 1 minute, and a leakage current (LC) was measured. The results are shown in FIG. 6.

Figure 6:
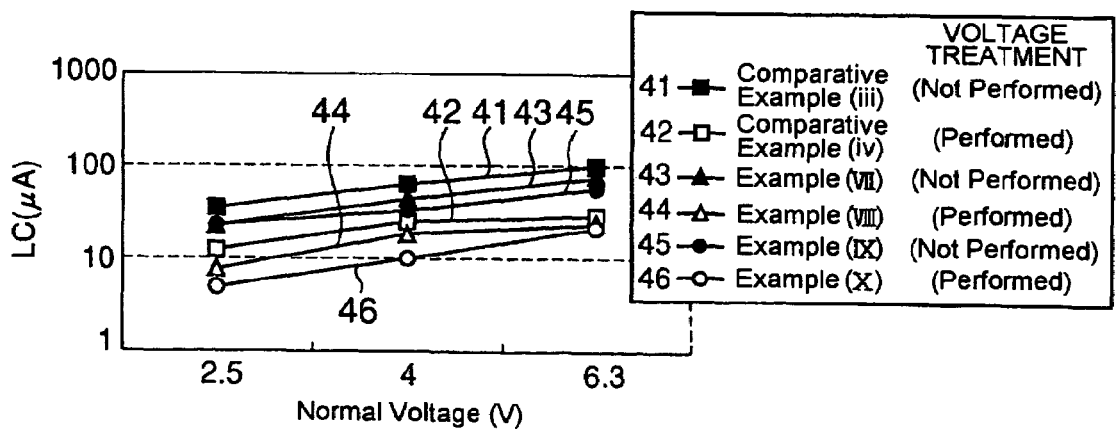
FIG. 6 is a graph showing leakage currents (LC) when constant voltages of 2.5 V, 4 V, and 6.3 V were supplied to solid electrolytic capacitors of Examples (VII), (VIII), (IX), and (X) according to the present invention and solid electrolytic capacitors of Comparative Examples (iii) and (iv).

The results of FIG. 6 show that the solid electrolytic capacitors having a thin precoat layer of polystyrene sulfonate in Examples (VII), (VIII), (IX), and (X), as indicated by lines 43 to 46, had small leakage currents at the respective voltages, as with the solid electrolytic capacitors in Comparative Examples (iii) and (iv) shown by lines 41 and 42. Further, the solid electrolytic capacitors of Comparative Example (iv) and Examples (VIII) and (X), which were subjected to a voltage treatment after formation of the precoat layer, had leakage currents smaller than the solid electrolytic capacitors of Comparative Example (iii) and Examples (VII) and (IX), which were not subjected to a voltage treatment.

As described above, according to the embodiment of the present invention, a precoat of polystyrene sulfonate helps to reduce a leakage current compared with a conventional precoat layer of polystyrene sulfonic acid, and helps to enhance a coverage. Accordingly, the present invention provides a solid electrolytic capacitor having a large capacitance and a low ESR with a compact structure.

In the illustrated embodiment, a first anode terminal connection portion 9 and a second anode terminal connection portion 9 are provided on both sides of the anode portion 11. Further, first and second anode terminals are provided on the first and second anode terminal connection portions 9, respectively. A voltage is supplied between the first anode terminal and the cathode portion by a power source. A load is connected between the second anode terminal and the cathode portion. However, the present invention is not limited to a solid electrolytic capacitor having such a transmission line structure. The present invention is applicable to a solid electrolytic capacitor having a general structure, which includes one anode terminal connection portion on which one anode terminal is provided.

A solid electrolytic capacitor according to the present invention is used in various electronic devices. Further, a solid electrolytic capacitor having a transmission line structure is used to stabilize coupling circuits or power supply circuits in power sources.

In the above embodiment, only polypyrrole and 3,4-ethylene dioxy thiophene are used for a conductive polymer layer serving as a solid electrolyte. However, the conductive polymer layer is not limited to these conductive polymers. Any conductive polymer may be used for a conductive polymer.

Although certain preferred embodiments of the present invention have been shown and described in detail, it should be understood that various changes and modifications may be made therein without departing from the scope of the appended claims.

What is claimed is:

1. A solid electrolytic capacitor comprising:
   an aluminum substrate having a roughened surface;
   an anodic oxide film layer formed on said roughened surface of said aluminum substrate;
   a polystyrene sulfonate layer formed on a portion of said anodic oxide film layer; and
   a conductive polymer film layer formed as a solid electrolyte on said polystyrene sulfonate layer so that said polystyrene sulfonate layer is interposed between said anodic oxide film layer and said conductive polymer film layer.

2. The solid electrolytic capacitor as recited in claim 1, wherein said polystyrene sulfonate layer is formed by immersing said aluminum substrate in an aqueous solution and drying said aluminum substrate, the aqueous solution being prepared by adding at least one of an amine, an amine salt produced by reaction of an amine and an organic acid, an ammonium salt of an organic acid or an inorganic acid, and ammonia water to a polystyrene sulfonic acid solution having a concentration of 0.1 to 10 weight % to adjust a pH of the aqueous solution in a range of from 2 to 6.

3. The solid electrolytic capacitor as recited in claim 2, wherein the amine includes at least one of triethylamine and triethanolamine, wherein the amine salt includes at least one of amine salts produced by reaction of the amine and at least one of boric acid, malonic acid, maleic acid, adipic acid, sebacic acid, dodecanoic acid, citric acid, phthalic acid, terephthalic acid, and pyromellitic acid, and the ammonium salt includes at least one of an ammonium borate, an ammonium adipate, an ammonium sebacate, and an ammonium dodecanoate.

4. The solid electrolytic capacitor as recited in any one of claims 1 through 3, wherein a voltage treatment is performed with an aqueous solution containing an ammonium salt of an organic acid of adipic acid or citric acid after said polystyrene sulfonate layer is formed.

5. The solid electrolytic capacitor as recited in claim 1, further comprising:

an anode portion including said portion of said anodic oxide film layer on said aluminum substrate;

a cathode portion including said polystyrene sulfonate layer on said portion of said anodic oxide film layer and said conductive polymer layer on said polystyrene sulfonate layer, said cathode portion having a cathode terminal connection portion formed on said conductive polymer layer; and an anode terminal connection portion formed at a portion of said aluminum substrate other than said anode portion.

6. The solid electrolytic capacitor as recited in claim 5, further comprising:

terminals connected to said cathode terminal connection portion and said anode terminal connection portion, respectively; and an enclosure made of synthetic resin or insulating material.

7. The solid electrolytic capacitor as recited in claim 1, wherein the solid electrolytic capacitor includes a transmission line element structure, which comprises:

an anode portion included in a central portion of the aluminum substrate, said aluminum substrate having anodic oxide film layer formed on a surface thereof;

first and second anode terminal connection portions located at both sides of said anode portion; and a cathode portion opposed to said anode portion and including said polystyrene sulfonate layer on said portion of said anodic oxide film layer and said conductive polymer layer on said polystyrene sulfonate layer.

8. The solid electric capacitor as recited in claim 7, further comprising:

terminals connected to said cathode terminal connection portion and said first and second anode terminal connection portions, respectively; and an enclosure made of synthetic resin or insulating material.

9. A method of manufacturing a solid electrolytic capacitor, said method comprising the steps of:

roughening a surface of an aluminum substrate;

forming an anodic oxide film layer on said surface of said aluminum substrate;

forming a polystyrene sulfonate layer on a portion of said anodic oxide film layer; and forming a conductive polymer film layer as a solid electrolyte on said polystyrene sulfonate layer.

10. The method as recited in claim 9, wherein said step of forming the polystyrene sulfonate layer comprises:

adding at least one of an amine, an amine salt produced by reaction of an amine and an organic acid, an ammonium salt of an organic acid or an inorganic acid, and ammonia water to a polystyrene sulfonic acid solution having a concentration of 0.1 to 10 weight % to prepare an aqueous solution having a pH of 2 to 6;

immersing said aluminum substrate in the aqueous solution; and drying said aluminum substrate.

11. The method as recited in claim 10, wherein the amine includes at least one of triethylamine and triethanolamine, wherein the amine salt includes at least one of amine salts produced by reaction of said amine and at least one of boric acid, malonic acid, maleic acid, adipic acid, sebacic acid, dodecanoic acid, citric acid, phthalic acid, terephthalic acid, and pyromellitic acid, wherein the ammonium salt includes at least one of an ammonium borate, an ammonium adipate, an ammonium sebacate, and an ammonium dodecanoate.

12. The method as recited in claim 9, further comprising the step of:

performing a voltage treatment with an aqueous solution containing an ammonium salt of an organic acid of adipic acid or citric acid after said step of forming said polystyrene sulfonate layer.

13. The method as recited in claim 9, wherein an anode portion is formed so as to include said portion of said anodic oxide film layer on said aluminum substrate, a cathode portion is formed so as to include said polystyrene sulfonate layer on said portion of said anodic oxide film layer, said conductive polymer layer on said polystyrene sulfonate layer, and a cathode terminal connection portion formed on said conductive polymer layer, and an anode terminal connection portion is formed at a portion of said aluminum substrate other than said anode portion.

14. The method as recited in claim 13, wherein said solid electrolytic capacitor includes:

terminals connected to said cathode terminal connection portion and said anode terminal connection portion, respectively; and an enclosure made of synthetic resin or insulating material.

15. The method as recited in claim 13, wherein the solid electrolytic capacitor includes a transmission line element structure, which comprises:

an anode portion included in a central portion of the aluminum substrate, said aluminum substrate having anodic oxide film layer formed on a surface thereof;

first and second anode terminal connection portions located at both sides of said anode portion; and a cathode portion opposed to said anode portion and including said polystyrene sulfonate layer on said portion of said anodic oxide film layer and said conductive polymer layer on said polystyrene sulfonate layer.

16. The method as recited in claim 15, wherein the solid electrolytic capacitor includes a transmission line element structure, which comprises:

terminals connected to said cathode terminal connection portion and said first and second anode terminal connection portions, respectively; and an enclosure made of synthetic resin or insulating material.

* * * * *